(12) United States Patent
Vermeiren et al.

(10) Patent No.: US 8,889,933 B2
(45) Date of Patent: *Nov. 18, 2014

(54) PROCESS FOR THE STEAMCRACKING OF BIO-NAPHTHA PRODUCED FROM COMPLEX MIXTURES OF NATURAL OCCURRING FATS AND OILS

(71) Applicant: Total Research & Technology Feluy, Seneffe (BE)

(72) Inventors: Walter Vermeiren, Houthalen (BE); Francois Bouvart, Senlis (BE); Nicolas Dubut, Metz (FR)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,429

(22) Filed: Nov. 5, 2013

(65) Prior Publication Data
US 2014/0114105 A1   Apr. 24, 2014

Related U.S. Application Data

(62) Division of application No. 13/382,371, filed as application No. PCT/EP2010/060031 on Jul. 13, 2010, now Pat. No. 8,624,071.

(30) Foreign Application Priority Data

Jul. 27, 2009   (EP) .................................. 09166486

(51) Int. Cl.
| | | |
|---|---|---|
| C10G 9/36 | (2006.01) | |
| C11C 3/12 | (2006.01) | |
| C10G 3/00 | (2006.01) | |
| C11C 1/10 | (2006.01) | |
| C11B 3/06 | (2006.01) | |
| C11C 3/10 | (2006.01) | |

(52) U.S. Cl.
CPC .......... *C10G 3/40* (2013.01); C10G 2300/1014 (2013.01); C10G 2300/1007 (2013.01); C10G 2400/22 (2013.01); *C11C 3/123* (2013.01); *C11C 1/10* (2013.01); *C11B 3/06* (2013.01); *C10G 3/49* (2013.01); *C11C 3/10* (2013.01); C10G 2300/807 (2013.01); *C10G 3/45* (2013.01); *C10G 3/50* (2013.01); C10G 2400/02 (2013.01); C10G 2400/20 (2013.01); C10G 2300/805 (2013.01); *C11C 3/126* (2013.01); C10G 2400/30 (2013.01); Y02E 50/13 (2013.01); *C10G 3/46* (2013.01); C10G 2300/1018 (2013.01)
USPC .......................................... 585/240; 585/242

(58) Field of Classification Search
CPC .... C10G 9/36; C10G 9/00; C10G 2300/1014; C10G 2300/807
See application file for complete search history.

(56) References Cited

U.S. PATENT DOCUMENTS

| | | | |
|---|---|---|---|
| 2007/0281875 | A1 | 12/2007 | Scheibel et al. |
| 2009/0084026 | A1 | 4/2009 | Miller |
| 2010/0292517 | A1* | 11/2010 | Debuisschert et al. ....... 585/251 |

OTHER PUBLICATIONS

Office Action issued in Korean Patent Application No. 2012-7002452 dated Mar. 31, 2014, and English translation thereof (12 pages).

*Primary Examiner* — Tam M Nguyen (57) ABSTRACT

A process can include making a bio-diesel, a bio-naphtha, and optionally bio-propane from a complex mixture of natural occurring fats & oils. The complex mixture can be subjected to a refining treatment for removing a major part of non-triglyceride and non-fatty acid components to obtain refined oils. The refined oils can be subjected to a fractionation step to obtain a substantially unsaturated liquid triglyceride part (phase L), and a substantially saturated solid triglyceride part (phase S). The phase L can transformed into alkyl-esters as bio-diesel by a transesterification. The phase S can be transformed into substantially linear paraffin's as the bio-naphtha by an hydrodeoxygenation. Fatty acids can be obtained from the phase S and transformed into substantially linear paraffin's as the bio-naphtha by hydrodeoxygenation or decarboxylation. Fatty acids soaps can be obtained from the phase S that are transformed into substantially linear paraffin's as the bio-naphtha by decarboxylation.

20 Claims, 5 Drawing Sheets

PROCESS FOR THE STEAMCRACKING OF BIO-NAPHTHA PRODUCED FROM COMPLEX MIXTURES OF NATURAL OCCURRING FATS AND OILS

CROSS-REFERENCE TO RELATED APPLICATIONS

This application is a Divisional of U.S. application Ser. No. 13/382,371, filed on Feb. 24, 2012, now U.S. Pat. No. 8,624,071, which claims the benefit of PCT/EP2010/060031, filed on Jul. 13, 2010, which claims priority from EP 09166486.2, filed on Jul. 27, 2009.

FIELD OF THE INVENTION

The present invention relates to the production of bio-naphtha and bio-distillates in an integrated bio-refinery from complex mixtures of natural occurring fats & oils. The limited supply and increasing cost of crude oil and the need to reduce emission of fossil based carbon dioxides has prompted the search for alternative processes for producing hydrocarbon products such as bio-naphtha and bio-diesel. The bio-naphtha can be used as feedstock of conventional steamcracking. Made up of organic matter from living organisms, biomass is the world's leading renewable energy source.

In the following, "bio-diesel" is sometimes referred to as "bio-distillates"

BACKGROUND OF THE INVENTION

Made from renewable sources, bio-distillates as an alternative fuel for diesel engines is becoming increasingly important. In addition to meeting engine performance and emissions criteria/specifications, bio-distillates has to compete economically with petroleum-distillates and should not compete with food applications for the same triglycerides. Vegetable oils partially or fully refined and of edible-grade quality, are currently predominant feedstock for bio-diesel production. The prices of these oils are relatively high for fuel-grade commodities.

These considerations have led to efforts to identify less expensive materials that could serve as feedstock for bio-diesel production and to design chemical processes for their conversion. Thus, animal fats have been converted to bio-diesel [C. L. Peterson, D. L. Reece, B. L. Hammond, J. Thompson, S. M. Beck, "processing, characterization and performance of eight fuels from lipids", Applied Engineering in Agriculture. Vol. 13(1), 71-79, 1997; F. Ma, L. D. Clements and M. A. Hanna, "The effect of catalyst, free fatty acids and water on transesterification of beef tallow", Trans ASAE 41 (5) (1998), pp. 1261-1264], and substantial efforts have been devoted to the development of waste restaurant grease [M. Canakci and J. Van Gerpen, "Bio-destillates production from oils and fats with high free fatty acids", Trans. ASAE 44 (2001), pp. 1429-1436; Y. Zhang, M. A. Dube, D. D. McLean and M. Kates, "Bio-destillates production from waste cooking oil. 1. Process design and technological assessment", Bioresour. Technol. 89 (2003), pp. 1-16; W.-H. Wu, T. A. Foglia, W. N. Manner, R. O. Dunn, C. E. Goering and T. E. Briggs, J. Am. Oil Chem. Soc. 75 (1998) (9), p. 1173], largely the spent product of the deep fat frying of foods, as a bio-diesel feedstock.

The industrial chemistry of fats & oils is a mature technology, with decades of experience and continuous improvements over current practices. Natural fats & oils consist mainly of triglycerides and to some extent of free fatty acids (FFA). Many different types of triglycerides are produced in nature, either from vegetable as from animal origin. Fatty acids in fats & oils are found esterified to glycerol (triacylglycerol). The acyl-group is a long-chain ($C_{12}$-$C_{22}$) hydrocarbon with a carboxyl-group at the end that is generally esterified with glycerol. Fats & oils are characterized by the chemical composition and structure of its fatty acid moiety. The fatty acid moiety can be saturated or contain one or more double bonds. Bulk properties of fats & oils are often specified as "saponification number", "Iodine Value", "unsaponification number". The "saponification number", which is expressed as grams of fat saponified by one mole of potassium hydroxide, is an indication of the average molecular weight and hence chain length. The "Iodine value", which is expressed as the weight percent of iodine consumed by the fat in a reaction with iodine monochloride, is an index of unsaturation.

Some typical sources of fats & oils and respective composition in fatty acids are given by way of example in Table 1.

TABLE 1

| | Symbol | Cotton- | Coconut | Corn | Palm | Peanut | Palm | Linseed | Rice | Rape- | Olive |
|---|---|---|---|---|---|---|---|---|---|---|---|
| Saturated | | | | | | | | | | | |
| Caproic | 6:0 | | 0.4 | | 0.2 | | | | | | |
| Caprylic | 8:0 | | 7.3 | | 3.3 | | | | | | |
| Capric | 10:0 | | 6.6 | | 3.5 | | | | | | |
| Lauric | 12:0 | | 47.8 | | 47.8 | | 0.2 | | | | |
| Myristic | 14:0 | 0.9 | 18.1 | | 16.3 | 0.1 | 1.1 | | 0.4 | | 0.02 |
| Palmitic | 16:0 | 24.7 | 8.9 | 10.9 | 8.5 | 11.6 | 44.1 | 6.0 | 19.8 | 3.9 | 10.5 |
| Margaric | 17:0 | | | | | | | | | | 0.05 |
| Stearic | 18:0 | 2.3 | 2.7 | 1.8 | 2.4 | 3.1 | 4.4 | 2.5 | 1.9 | 1.9 | 2.6 |
| Arachidic | 20:0 | 0.1 | 0.1 | | | 1.5 | 0.2 | 0.5 | 0.9 | 0.6 | 0.4 |
| Behenic | 22:0 | | | | | 3.0 | | | 0.3 | 0.2 | 0.2 |
| Lignoceric | 24:0 | | | | | 1.0 | | | | 0.2 | 0.1 |
| TOTAL | | 28.0 | 91.9 | 22.7 | 82.0 | 20.3 | 50 | 9.0 | 23.3 | 6.8 | 13.87 |
| Unsaturated | | | | | | | | | | | |
| Myristoleic | 14:1 w-5 | | | | | | | | | | |
| Palmitoleic | 16:1 w-7 | 0.7 | | | | 0.5 | | 0.1 | 0.2 | | 0.6 |
| Heptadecenoic | 17:1 w-15 | | | | | | | | | | 0.09 |
| Oleic | 18:1 w-9 | 17.6 | 6.4 | 24.2 | 15.4 | 38.0 | 37.5 | 19.0 | 42.3 | 64.1 | 76.9 |
| Linoleic | 18:2 w-6 | 53.3 | 1.6 | 58.0 | 2.4 | 41.0 | 10 | 24.1 | 31.9 | 18.7 | 7.5 |

TABLE 1-continued

| | | | | | | | | | | | |
|---|---|---|---|---|---|---|---|---|---|---|---|
| Linolenic | 18:3 w-3 | 0.3 | | 0.7 | | | | 47.4 | 1.2 | 9.2 | 0.6 |
| Gadolenic | 20:1 w-9 | | | | 1.0 | 0.5 | | 0.5 | 1.0 | 0.3 | |
| TOTAL Polyunsaturated | | 72.0 | 8.1 | 77.3 | 18.0 | 79.7 | 50 | 91 | 76.7 | 93.2 | 86.13 |
| Ricinoleic | 18 | | | | | | | | | | |
| Rosin acids | — | | | | | | | | | | |
| % FFA | | 0.5-0.6 | 1.0-3.5 | 1.7 | 0.1 | 0.8 | 2-14 | 2 | 5-15 | 0.5-3.8 | 0.5-3.3 |

| | Soy- | Sun- | Linola | Lard | Butterfat | Tallow | Tall | Castor | *Jatropha* |
|---|---|---|---|---|---|---|---|---|---|
| Saturated | | | | | | | | | |
| Caproic | | | | | 2 | | | | |
| Caprylic | | | | | 2 | | | | |
| Capric | | | | | 3 | | | | |
| Lauric | | 0.5 | | 0.5 | 3.5 | | | | |
| Myristic | 0.1 | 0.2 | | 1.5 | 11 | 3 | | | |
| Palmitic | 11.0 | 6.8 | 5.6 | 26 | 26 | 26 | 2 | 1.0 | 14.6 |
| Margaric | | | | 0.5 | | 0.5 | | | |
| Stearic | 4.0 | 4.7 | 4.0 | 13.5 | 11 | 22.5 | 1 | 1.0 | 7.4 |
| Arachidic | 0.3 | 0.4 | | | 2 | | 0.5 | | |
| Behenic | 0.1 | | | | | | | | |
| Lignoceric | | | | | | | | | |
| TOTAL | 15.5 | 12.6 | 9.6 | 42.0 | 60.5 | 52.0 | 3.5 | 2.0 | 22.0 |
| Unsaturated | | | | | | | | | |
| Myristoleic | | | | | | 0.5 | | | |
| Palmitoleic | 0.1 | 0.1 | | 4 | 2 | 2.5 | | | 0.8 |
| Heptadecenoic | | | | 0.5 | 3 | 0.5 | | | |
| Oleic | 23.4 | 18.6 | 15.9 | 43 | 26 | 43 | 16 | 3.0 | 47.5 |
| Linoleic | 53.2 | 68.2 | 71.8 | 9 | 2.5 | 1.5 | 20 | 4.2 | 28.7 |
| Linolenic | 7.8 | 0.5 | 2.0 | 0.5 | 4 | | | 0.3 | 1.0 |
| Gadolenic | | | | 1 | | | 0.5 | | |
| TOTAL Polyunsaturated | 84.5 | 87.4 | 90.4 | 58.0 | 37.5 | 48.0 | 54.5 | 7.5 | 78.0 |
| Ricinoleic | | | | | 2 | | 4 | 89.5 | |
| Rosin acids | | | | | | | 40 | | |
| % FFA | 0.3-1.6 | 0.1-1.5 | 0.3 | 0.5 | | 5-20 | | | |

Bio-distillates feedstock are classified based on their free fatty acid (FFA) content as follows [J. A. Kinast, "Production of bio-distillates from multiple feedstock and properties of bio-distillates and bio-distillates/-distillates blends", NREL/SR-510-31460 report (2003)]:

Refined oils, such as soybean or refined canola oils (FFA<1.5%);

Low free fatty acid yellow greases and animal fats (FFA<4.0%);

High free fatty acid greases and animal fats (FFA>20.0%).

Bio-diesel is currently produced by transesterification of triglyceride with methanol, producing methyl-ester and glycerol. This transesterification is catalyzed by homogeneous or heterogeneous basic catalyst. Typically homogeneous catalyst are alkali hydroxides or alkali alkoxides and typical heterogeneous catalyst are alkaline earth or zinc oxide materials, like zinc or magnesium-aluminate spinels. The presence of free fatty acids (FFA) in the raw triglycerides is a cumbersome for the production of bio-diesel as the FFA's react stoechiometrically with the basic catalyst producing alkali or alkaline soaps. This means that fats & oils that contain significant amounts of FFA's cannot be employed directly for bio-diesel production with this process. Several technical solutions have been proposed: (i) starting with an acid catalysed interesterification with additional glycerol to convert FFA's into glycerides prior to the basic transesterification; (ii) prior to the basic catalyzed transesterification the FFA's are removed by steam and/or vacuum distillation. The latter results in a net loss of feedstock for the production of bio-diesel. Eventually, the so produced FFA's can be converted by acid catalysis into esters in a separate process unit. FFA's can be present in triglycerides in different concentrations and can be present as such resulting from the extraction process or can be produced during storage as of the presence of trace amounts of lipase enzyme that catalyse the triglyceride hydrolysis or can be produced during processing, like thermal treatments during cooking.

There are other potential feedstock available at this time, namely trap and sewage grease and other very high free fatty acid greases who's FFA can exceed 50%.

The main sources of fats & oils are palm and palm kernels, soybeans, rapeseed, sunflower, coconut, corn, animal fats, milk fats.

Potentially new sources of triglycerides will become available in the near future, namely those extracted from Jatropha and those produced by microalgues. These microalgues can accumulate more then 30 wt % of lipids on dry basis and they can either be cultivated in open basin, using atmospheric $CO_2$ or in closed photobioreactors. In the latter case, the required $CO_2$ can originate from the use of fossil hydrocarbons that are captured and injected into the photobioreactor. Main sources of fossil $CO_2$ are power stations, boilers used in refineries and steamcrackers furnaces used to bring hydrocarbon streams at high temperature or to supply heat of reactions in hydrocarbon transformations in refineries and steamcrackers. In particular steamcracking furnaces produce a lot of $CO_2$. In order to enhance the $CO_2$ concentration in flue gases of these furnaces, techniques like oxycombustion, chemical looping or absorption of $CO_2$ can be employed. In oxycombustion, oxygen is extracted from air and this pure oxygen is used to burn hydrocarbon fuels as to obtain a stream only containing water and $CO_2$, allowing concentrating easily the $CO_2$ for storage or re-utilisation. In chemical looping, a solid material acts as oxygen-transfer agent from a re-oxidation zone where the reduced solid is re-oxidised with air into oxidised solid to a combustion zone, where the hydrocarbon fuel is burned with the oxidised solid and hence the effluent resulting from the combustion zone only contains water and $CO_2$. Absorption of $CO_2$ can be done with the help of a lean solvent that has a high preferential to absorb $CO_2$ under pressure and typically at low temperature and will release the $CO_2$ when depressurised and/or heated. Rectisol® and Selexol® are commercial available technologies to remove and concentrate $CO_2$. Other sources of $CO_2$ are the byproduct from carbohydrates fermentation into ethanol or other alcohols and the removal of excess $CO_2$ from synthesis gas made from biomass or coal gasification.

US 2007/0175795 reports the contacting of a hydrocarbon and a triglyceride to form a mixture and contacting the mixture with a hydrotreating catalyst in a fixed bed reactor under conditions sufficient to produce a reaction product containing diesel boiling range hydrocarbons. The example demonstrates that the hydrotreatment of such mixture increases the cloud point and pour point of the resulting hydrocarbon mixture.

US 2004/0230085 reports a process for producing a hydrocarbon component of biological origin, characterized in that the process comprises at least two steps, the first one of which is a hydrodeoxygenation step and the second one is an isomerisation step. The resulting products have low solidification points and high cetane number and can be used as diesel or as solvent.

US 2007/0135669 reports the manufacture of branched saturated hydrocarbons, characterized in that a feedstock comprising unsaturated fatty acids or fatty acids esters with C1-C5 alcohols, or mixture thereof, is subjected to a skeletal isomerisation step followed by a deoxygenation step. The results demonstrate that very good cloud points can be obtained. US 2007/0039240 reports on a process for cracking tallow into diesel fuel comprising: thermally cracking the tallow in a cracking vessel at a temperature of 260-371° C., at ambient pressure and in the absence of a catalyst to yield in part cracked hydrocarbons.

U.S. Pat. No. 4,554,397 reports on a process for manufacturing olefins, comprising contacting a carboxylic acid or a carboxylic ester with a catalyst at a temperature of 200-400° C., wherein the catalyst simultaneously contains nickel and at least one metal from the group consisting of tin, germanium and lead.

It has been discovered a process to make bio-naphtha and bio-diesel in an integrated biorefinery from all kinds of natural triglycerides or fatty acids. In said process crude fats & oils are refined, either physically or chemically, to remove all non-triglyceride and non-fatty acid components. The refined oils are next fractionated in both liquid and solid fractions. This process aims at separating a starting material into a low melting fraction, the liquid fraction, consisting of triglycerides, having double bonds in the acyl-moieties and a high melting fraction the solid fraction, consisting of substantially saturated acyl-moieties. This process allows optimising the use of the different molecules constituting the natural fats & oils. Bio-destillates require specific cold-flow properties that requires double bonds in the acyl-moiety. On the other hand, the quality of a steamcracker feedstock is better when the hydrocarbon is saturated and linear.

The liquid fraction, potentially mixed with some limited solid fraction, is transesterified with a $C_1$ to $C_5$ monofunctional alcohol to produce alkyl fatty esters, called also bio-diesel, and glycerol. The amount of solid fraction should be so that the final cold-flow properties are according to the local market specifications.

The solid fraction, potentially mixed with some liquid fraction, can be converted to produce bio-naphtha and optionally bio-propane. The solid fraction can be directly hydrodeoxygenated or can also be hydrolyzed to give fatty acids, potentially mixed with those produced during refining. Then fatty acids can be hydrodeoxygenated or decarboxylated to bio-naphtha. The solid fraction can also be saponified to produce glycerol and soap that can subsequently be decarboxylated.

As several sources of fats & oils are not suitable to be converted in ester-type bio-diesel because they contain too much saturated acyl-moieties that result in high pour-points and hence improper cold-flow properties, the present invention solves this problem by an appropriate separation of the starting complex mixtures, allowing an optimal usage of fats & oils for making bio-diesel and bio-naphtha.

The use of a biofeed is a possible solution in the search of alternative raw material for the naphthacracker. Nevertheless, using this type of feed can lead to corrosion problems and excessive fouling because of oxygenates forming from the oxygen atoms in the biofeed. Also existing steamcrackers are not designed to remove high amounts of carbonoxides that would result from the steamcracking of these biofeedstock. According to the present invention, such a problem can be solved by hydrodeoxygenating/decarboxylating (or decarbonylating) this biofeed before its injection into the steam cracker. Thanks to this hydrodeoxygenation/decarboxylation (or decarbonylation), the negative effect due to the production of CO and $CO_2$ and traces of low molecular weight oxygenates (aldehydes and acids) in the steam cracker is reduced.

Another advantage is of course the production of bio-monomers in the steam cracker.

BRIEF DESCRIPTION OF THE INVENTION

The subject-matter of the present invention is in an embodiment 1 a process for making a bio-diesel and a bio-naphtha from a complex mixture of natural occurring fats & oils, wherein said complex mixture is subjected to a refining treatment for removing the major part of the non-triglyceride and non-fatty acid components, thereby obtaining refined oils;

said refined oils are subjected to a fractionation step for obtaining:
an unsaturated or substantially unsaturated, liquid or substantially liquid triglyceride part (phase L); and
a saturated or substantially saturated, solid or substantially solid triglyceride part (phase S); and said phase L is transformed into alkyl-esters as bio-diesel by a transesterification;

said phase S is transformed into linear or substantially linear paraffin's as the bio-naphtha:
by an hydrodeoxygenation
or from said phase S are obtained fatty acids that are transformed into linear or substantially linear paraffin's as the bio-naphtha by hydrodeoxygenation or decarboxylation of the free fatty acids
or from said phase S are obtained fatty acids soaps that are transformed into linear or substantially linear paraffin's as the bio-naphtha by decarboxylation of the soaps.

In an embodiment 2 the invention is according to embodiment 1, wherein said complex mixture of natural occurring fats & oils is selected among vegetable oils and animal fats, preferentially inedible oils, highly saturated oils, waste food oils, by-products of the refining of vegetable oils, and mixtures thereof.

In an embodiment 3 the invention is according to embodiment 1 or 2, wherein said fatty acids are obtained by physical refining, including a steam distillation or vacuum distillation of fats & oils or said fatty acids are obtained by hydrolysis of triglycerides of the fats & oils or said fatty acids are obtained by acidulation of soaps.

In an embodiment 4 the invention is according to anyone of embodiments 1 and 2, wherein said refined oils are fractioned into said phases L and S by a fractional crystallisation method which consists in a controlled cooling down during which the triglycerides of said complex mixture with substantially saturated acyl-moieties crystallize and precipitate from the mixture forming said phase S, while the triglycerides with substantially unsaturated acyl-moieties remain liquid forming said phase L, both phases being then separated by simple filtration or decantation or centrifugation.

In an embodiment 5 the invention is according to embodiments 1, 2 and 4, wherein said phase L is transesterified with a $C_1$-$C_5$ monofunctional alcohol in order to produce alkyl fatty esters as bio-diesel and glycerol.

In an embodiment 6 the invention is according to embodiment 1 or 2, wherein said fatty acid soaps are obtained by saponification of fats & oils or by the chemical refining, including neutralisation of free fatty acids, present in the fats & oils or neutralisation of fatty acids, obtained from hydrolysis of the fats & oils In an embodiment 7 the invention is according to anyone of embodiments 1 to 4, wherein said phase S is transformed into linear or substantially linear paraffins as bio-naphtha together with bio-propane by hydrodeoxygenation in the presence of hydrogen and of at least one catalyst that can be selected among Ni, Mo, Co or mixtures like NiW, NiMo, CoMo, NiCoW, NiCoMo, NiMoW and CoMoW oxides or sulphides as catalytic phase, preferably supported on high surface area carbon, alumina, silica, titania or zirconia.

In an embodiment 8 the invention is according to embodiment 7, wherein the hydrodeoxygenation is carried out at a temperature from 200 to 500° C., under a pressure from 1 MPa to 10 MPa (10 to 100 bars) and with a hydrogen to feed ratio from 100 to 2000 Nl/l.

In an embodiment 9 the invention is according to anyone of embodiments 1 to 4, wherein said phase S is transformed into linear or substantially linear paraffins as bio-naphtha by hydrolysis into glycerol and fatty acids, removal of the glycerol or by physical refining, including a steam distillation or vacuum distillation of fats & oils or obtained by acidulation of soaps and hydrodeoxygenation or decarboxylation of the fatty acids, said hydrodeoxygenation or decarboxylation being conducted in the presence of hydrogen and of at least one catalyst that can be selected among Ni, Mo, Co or mixtures like NiW, NiMo, CoMo, NiCoW, NiCoMo, NiMoW and CoMoW oxides or sulphides as catalytic phase, preferably supported on high surface area carbon, alumina, silica, titania or zirconia or group 10 (Ni, Pt and Pd) and group 11 (Cu and Ag) metals or alloy mixtures supported on high surface area carbon, magnesia, zinc-oxide, spinels ($Mg_2Al_2O_4$, $ZnAl_2O_4$), perovskites ($BaTiO_3$, $ZnTiO_3$), calciumsilicates (like xonotlite), alumina, silica or silica-alumina's or mixtures of the latter.

In an embodiment 10 the invention is according to anyone of embodiments 1 to 4, wherein said phase S is transformed into linear or substantially linear paraffin's as bio-naphtha by hydrolysis into glycerol and fatty acids, removal of the glycerol or by physical refining, including a steam distillation or vacuum distillation of fats & oils or obtained by acidulation of soaps and decarboxylation of the fatty acids is carried out on basic oxides, like alkaline oxides, alkaline earth oxides, lanthanide oxides, zinc-oxide, spinels ($Mg_2Al_2O_4$, $ZnAl_2O_4$), perovskites ($BaTiO_3$, $ZnTiO_3$), calciumsilicates (like xonotlite), either as bulk material or dispersed on neutral or basic carriers, on basic zeolites (like alkali or alkaline earth low silica/alumina zeolites obtained by exchange or impregnation).

In an embodiment 11 the invention is according to anyone of embodiments 7 to 10, wherein the hydrodeoxygenation is carried out at a temperature from 200 to 500° C., under a pressure from 1 MPa to 10 MPa (10 to 100 bars) and with a hydrogen to feedstock ratio from 100 to 2000 Nl/l. or wherein the decarboxylation is carried out at a temperature from 100 to 550° C., under a pressure from 0.1 MPa to 10 MPa (1 to 100 bars) and with a hydrogen to feedstock ratio from 0 to 2000 Nl/l.

In an embodiment 12 the invention is according to embodiments 1 to 4 and 6, wherein the decarboxylation of the soaps is carried out at from 100 to 550° C. under pressure from 0.1 Mpa to 10 Mpa and in presence of water.

In an embodiment 13 the invention is according to embodiments 1 to 4 and 6, wherein the decarboxylation of the soaps is carried out with a water to feedstock ratio of at least 1 mole water per mole of soap.

In an embodiment 14 the invention is the Use of the bio-naphtha as obtained in the process of embodiments 1 to 4 and 6 to 13, as a direct feedstock of a steamcracker, said bio-naphtha being used as such, or optionally together with bio-propane, or as blended with at least a conventional feedstock selected among LPG, naphtha and gasoil, in order to obtain cracked products including bio-ethylene, bio-propylene, bio-butadiene, bio-isoprene, bio-cyclopentadiene and bio-piperylenes, bio-benzene, bio-toluene, bio-xylene and bio-gasoline.

In an embodiment 15 the invention is a process for steam cracking a feedstock as defined in embodiment 14, wherein said feedstock is mixed with steam in a ratio of 0.2 to 1.0 kg steam per kg feedstock, preferentially of 0.3 to 0.5 kg steam per kg feedstock and the mixture is heated up to a temperature of 750-950° C. at a residence time of 0.05 to 0.5 seconds.

In an embodiment 16 the invention is the Use of the bio-naphtha as obtained in the process of embodiments 1 to 15 for steamcracking such as to obtain a ethylene to methane weight ratio, resulting from the cracking of bio-naphtha, of at least 3.

By "bio-naphtha" we mean naphtha produced from renewable sources by hydrotreatment of these renewable sources. It is a hydrocarbon composition, consisting of mainly paraffin's and that can be used for the steamcracking to produce light olefins, dienes and aromatics. The molecular weight of this bio-naphtha ranges from hydrocarbons having 8 to 24 carbons, preferably from 10 to 18 carbons.

By "substantially linear paraffins", we mean a composition of paraffin's consisting of at least 90% by weight of linear paraffin's.

Said complex mixture of natural occurring fats & oils can be selected among vegetable oils and animal fats, preferentially inedible highly saturated oils, waste food oils, by-products of the refining of vegetable oils, and mixtures thereof. Specific examples of these fats & oils have been previously mentioned in the present specification.

Said refined fats & oils can be advantageously fractioned into said phases L and S by a fractional crystallisation method which consists in a controlled cooling down during which the triglycerides of said complex mixture with substantially saturated acyl-moieties crystallize and precipitate from the mixture forming said phase S, while the triglycerides with substantially unsaturated acyl-moieties remain liquid forming said phase L, both phases being then separated by simple filtration or decantation or centrifugation.

Said phase L can be transesterified with a $C_1$-$C_5$ monofunctional alcohol in order to produce alkyl fatty esters as biodiesel and glycerol. Said alcohol can be methanol.

Said phase S, optionally still containing some free fatty acids can be transformed into linear or substantially linear paraffin's as bio-naphtha together with bio-propane by hydrodeoxygenation in the presence of hydrogen and of at least one hydrodeoxygenation catalyst The hydrodeoxygenation catalyst can be selected among Ni, Mo, Co or mixtures like NiW, NiMo, CoMo, NiCoW, NiCoMo, NiMoW and CoMoW oxides or sulphides as catalytic active phase, preferably supported on high surface area carbon, alumina, silica, titania or zirconia or group 10 (Ni, Pt or Pd) or group 11 (Cu or Ag) metals or alloy mixtures supported on high surface area carbon, magnesia, zinc-oxide, spinels ($Mg_2Al_2O_4$, $ZnAl_2O_4$), perovskites ($BaTiO_3$, $ZnTiO_3$), calciumsilicates (like xonotlite), alumina, silica or mixtures of the latter. It is preferred that the support for the catalytic active phase exhibit low acidity, preferable neutral or basic in order to avoid hydro-isomerisation reactions that would result in branched paraffin's and cracking. The hydrodeoxygenation of the fats & oils can be carried out at a temperature from 200 to 500° C., preferably from 280 to 400° C., under a pressure from 1 MPa to 10 MPa (10 to 100 bars), for example of 6 MPa, and with a hydrogen to refined oils ratio from 100 to 2000, but preferably from 350 to 1500 for example of 600 Nl H2/l oil.

Said phase S can also be transformed into linear or substantially linear paraffin's as bio-naphtha by producing fatty acids by (i) hydrolysis of the phase S fats & oils into glycerol and fatty acids, removal of the glycerol, by (ii) physical refining (steam/vacuum distillation) of phase S fats & oils or by acidulation of fatty acid soaps and subsequently hydrodeoxygenation or decarboxylation (or decarbonylation) of the fatty acids, or a combination of these processes. Advantageously said hydrodeoxygenation is conducted in the presence of hydrogen and of at least one hydrodeoxygenation or decarboxylation catalyst. The hydrodeoxygenation or decarboxylation catalyst can be selected among Ni, Mo, Co or mixtures like NiW, NiMo, CoMo, NiCoW, NiCoMo, NiMoW and CoMoW oxides or sulphides as catalytic phase, preferably supported on high surface area carbon, alumina, silica, titania or zirconia or group 10 (Ni, Pt or Pd) or group 11 (Cu or Ag) metals or alloy mixtures supported on high surface area carbon, magnesia, zinc-oxide, spinels ($Mg_2Al_2O_4$, $ZnAl_2O_4$), perovskites ($BaTiO_3$, $ZnTiO_3$), calciumsilicates (like xonotlite), alumina, silica or silica-alumina's or mixtures of the latter. It is preferred that the support for the catalytic active phase exhibit low acidity, preferable neutral or basic in order to avoid hydro-isomerisation reactions that would result in branched paraffin's and cracking. The hydrolysis (splitting) can be carried out in presence steam thermally at 15 to 75 bars and at 50-300° C. or catalytically, for example with basic catalysts, like MgO, CaO, ZnO, spinels (Mg2Al2O4, ZnAl2O4), perovskites (BaTiO3, ZnTiO3), calciumsilicates (like xonotlite) or basic alumina or with acidic catalysts, like sulphuric acid. Detailed information about fat & oil splitting has been published by Sonntag (Sonntag, N., J. Am. Oil. Chem. Soc., 56, p. 729, 1979 and Bailey's Industrial Oil and Fat Products, ed. F. Shahidi, 2005, John Wiley & Sons). In the Colgate-Emery process, heated liquid lipid is introduced at the bottom of a vertical tubular reactor. Heated water enters at the top. As the fats & oils rises through the descending water under pressure, a continuous zone of high water solubility in oil establishes, wherein hydrolysis occurs. Effluent from the column is recovered, fatty acids from one outlet and an aqueous glycerol stream from the other. The presence of small amounts of mineral acids, such as sulfuric acid or sulfonic acids or certain metal oxides, such as zinc or magnesium oxide, accelerates the splitting reaction. These metal oxides are true catalysts and they assist also in the formation of emulsions.

The hydrodeoxygenation of the fatty acids can be carried out at a temperature from 200 to 500° C., preferably from 280 to 400° C., under a pressure from 1 MPa to 10 MPa (10 to 100 bars), for example of 6 MPa, and with a hydrogen to refined oils ratio from 100 to 2000 Nl/l, for example of 600 Nl H2/l oil. The decarboxylation of the fatty acids can be carried out at 100 to 550° C. in absence or presence of hydrogen at pressures ranging from 0.01 up to 10 MPa.

Said phase S can also be transformed into linear or substantially linear paraffin's as bio-naphtha by thermal decarboxylation of fatty acid soaps. These soaps are obtained during chemical refining by neutralisation to convert free fatty acids into soaps, by neutralisation of fatty acids obtained by hydrolysis of phase S fats & oils or by complete saponification of phase S triglycerides into glycerol and soap. A soap is a metal salt of the corresponding fatty acid.

The present invention also relates to the use of the bio-naphtha as obtained in the above mentioned process, as a direct feedstock of a steamcracker, said bio-naphtha being used as such, or together with the bio-propane when produced by the above-mentioned process, or as blended with at least a conventional feedstock selected among LPG, naphtha and gasoil, in order to obtain cracked products including bio-ethylene, bio-propylene, bio-butadiene, bio-isoprene, bio-(di)cyclopentadiene, bio-piperylenes, bio-benzene, bio-toluene, bio-xylene and bio-gasoline.

Moreover, the present invention relates to a process for steam cracking a feedstock as defined above, wherein said feedstock is mixed with steam, having a steam/feedstock ratio of at least 0.2 kg per kg of feedstock. This mixture is sent through the heated coils, having a coil outlet temperature of at least 700° C. and a coil outlet pressure of at least 1.2 bara.

DETAILED DESCRIPTION OF THE INVENTION

All crude fats & oils obtained after rendering, crushing or solvent extraction inevitably contain variable amounts of non-triglyceride components such as free fatty acids, mono and diglycerides, phosphatides, sterols, tocopherols, tocotrienols hydrocarbons, pigments (gossypol, chlorophyll), vitamins (carotenoids), sterols glucosides, glycolipids, protein fragments, traces of pesticides and traces metals, as well as resinous and mucilaginous materials. The quantities of the non-glycerides vary with the oil source, extraction process, season and geographical source. Removal of the non-triglyceride components, which interfere with further processing and cause the oil to darken, foam, smoke, precipitate and develop off-flavours, is the objective of the refining process.

Refining Pretreatment
Choice of the Refining Method

Figure 1:
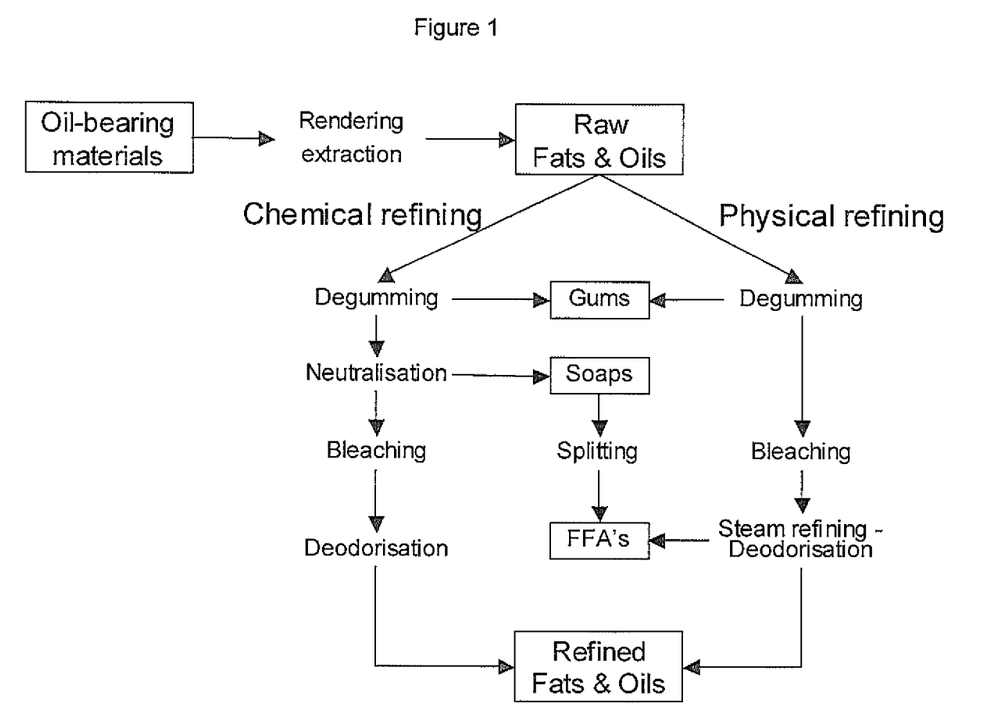
FIG. 1 illustrates a refining pretreatment in which crude oils are processed through various routes, physical or chemical, to Refined Bleached Deodorized (RBD) oils.

FIG. 1 illustrates the refining pretreatment in which crude oils are processed through various routes, physical or chemical, to Refined Bleached Deodorized (RBD) oils. Physical refining and alkali/chemical refining differ principally in the way free fatty acids are removed.

In chemical refining, FFA, most of the phosphatides, and other impurities are removed during neutralization with an alkaline solution, usually NaOH.

In physical refining, the FFA is removed by distillation during deodorization and the phosphatides and other impurities must be removed prior to steam distillation.fats & oils Currently, the refining method of choice is determined by the characteristics of the individual crude fats & oils:

(1) fats and oils that are normally physically refined;
(2) fats and oils that can be physically or chemically refined; and
(3) fats and oils that can only be chemically refined.

Table 2 below summarizes advantages and disadvantages of each treatment:

TABLE 2

| Refining type | Advantages | Disadvantages |
| --- | --- | --- |
| Chemical refining | Functional process | Production of by-products |
| | Not restricted by the oil type | Expensive process |
| | Successful reduction of FFA | High loss of oil |
| Physical refining | Cheaper | Not suitable for all types of oils |
| | Less by-products | Requires high temperature and vacuum |
| | Less energy consumed | Can form undesired side reaction products |

Physical Refining

The physical refining can remove the FFA, as well as the unsaponifiables and other impurities by steam stripping, thus eliminating the production of soapstock and keeping neutral oil loss to a minimum. However, degumming pretreatments of the crude fats & oils are still required to remove those impurities that darken or otherwise cause a poor-quality product when heated to the temperature required for steam distillation. A degumming process is crucial for physical refining but optional for chemical refining. It consists of the treatment of crude oils, with water, salt solutions, enzymes, caustic soda, or diluted acids such as phosphoric, citric or maleic to remove phosphatides, waxes, pro-oxidants and other impurities. The degumming processes convert the phosphatides to hydrated gums, which are insoluble in oil and readily separated as a sludge by settling, filtering or centrifugal action. After degumming, phosphorous must be less than 30 ppm. So that bleaching or dry degumming can further reduce this level to less than 5 ppm and remove all traces of iron and copper. Acid or enzymatic degumming processes are normally employed to achieve these results.

The various industrial degumming processes have different aims. Fats & oils to be degummed vary widely in gum content and gum properties and finally, the means of gum disposal available, what equipment is needed and/or available, and the cost of auxiliaries also influence the choice of the most appropriated degumming process. The lipid handbook (The lipid handbook, edited by Frank D. Gunstone, John L. Harwood, Albert J. Dijkstra. 3rd ed., chapter 3.4) deals with these aspects in details. Next is briefly described the four major degumming process applied on the market.

The main purposes of the water degumming process are to produce oil that does not deposit a residue during transportation and storage, and to control the phosphorus content of crude oils just below 200 ppm. This process involves the addition of live steam to raw oil for a short period. The proper amount of water is normally about 75% of the phosphatides content of the oil. Too little water produces dark viscous gums and hazy oil, while too much water causes excess oil losses through hydrolysis. Water-degummed oil still contains phosphatides (between 80 and 200 ppm); only hydratable phosphatides are removed with this process. The nonhydratable phosphatides, which are calcium and magnesium salts of phosphatic acid and phosphatidyl ethanolamine, remain in the oil after water degumming.

Acid degumming process leads to a lower residual phosphorus content than water degumming and is therefore a good alternative if dry degumming and physical refining are to be the next refining steps. The acid degumming process might be considered as a variant of the water degumming process in that it uses a combination of water and acid. The non-hydratable phosphatides can be conditioned into hydratable forms with acid degumming. Phosphoric and citric acids are used because they are food grade, sufficiently strong and they bind divalent metal ions. Several acid degumming processes have been developed to attain a phosphorus value lower than 5 ppm that is required for good quality physically refined oils.

An acid refining differs from the acid degumming by the neutralisation of the liberated phosphatides (the action of the degumming acid does not lead to full hydration of the phosphatides) to make them hydratable by the addition of a base.

In dry degumming process, the oil is treated with an acid (principle is that strong acids displace weaker acids from their salts) to decompose the metal ion/phosphatides complex and is then mixed with bleaching earth. The earth containing the degumming acid, phosphatides, pigments and other impurities is then removed by filtration. Seed oils that have been water or acid-degummed may also be dry degummed to ensure a low phosphorus oil to steam distillation. An increase in FFA of less than 0.2% should be expected but the final phosphorus content must be reduced to less than 5 ppm. This process constitutes the main treatment for palm oil, lauric oils, canola oil and low phosphatides animal fats, such as tallow or lard. The dry degumming process allows crude oil to be fully refined in only two steps: dry degumming and physical refining In enzymatic degumming process, Phospholipase A1, the lastest developed degumming enzyme, changes the phospholipids into lysophospholipids and free fatty acids. This process has three important steps:

(1) adjustement of the pH with a buffer;
(2) enzymatic reaction in the holding tanks; and
(3) separation of the sludge from the oil.

Oil to be degummed enzymatically by this way can be crude or water degummed.

The lipid handbook (The lipid handbook, edited by Frank D. Gunstone, John L. Harwood, Albert J. Dijkstra. 3rd ed.) describes many variants and details of the degumming processes.

The purpose of bleaching is to provide a decoloured oil but also to purify it in preparation for further processing. All fully refined oils have been subjected to one or the other bleaching process. Refined oil contains traces of a number of undesirable impurities either in solution or as colloidal suspensions. The bleaching process does more than just increasing the transmission of light through the oil and is often called "adsorptive cleaning.". The bleaching process is often the first filtration encountered by the oil, so it ensures the removal of soaps, residual phosphatides, trace metals, and some oxidation products, and it catalyses the decomposition of carotene and the adsorbent also catalyses the decomposition of peroxides. These non-pigment materials, such as soap, gums, and pro-oxidants metals, which hinder filtration, poison hydrogenation catalyst, darken the oils, and affect finished oil flavour. Another function is the removal of the peroxides and secondary oxidation products. The key parameters for the bleaching process are procedure, adsorbent type and dosage, temperature, time, moisture and filtration, as shown in the Lipid Handbook (The lipid handbook, edited by Frank D. Gunstone, John L. Harwood, Albert J. Dijkstra. 3rd ed., chapter 3.7). The three most common types of contact bleaching methods used for edible fats and oils are batch atmospheric, batch vacuum and continuous vacuum. Chemical agents have been used or proposed for use but practically all edible oil decolouration and purification is accomplished with adsorptive clays, synthetic amorphous silica and activated carbons.

Before the last major processing step, bleached oil can be hydrogenated, for two reasons. One reason is to change naturally occurring fats & oils into physical forms with the consistency and handling characteristics required for functionality. The second reason for hydrogenation is to increase the oxidation and thermal stability. Instead of purification in other described processes, this step consists in fats & oils molecular modification.

Hydrogen is added directly to react with unsaturated oil in the presence of catalysts, mostly nickel. This process greatly influences the desired stability and properties of many edible oil products. The hydrogenation process is easily controlled and can be stopped at any point. A gradual increase in the melting point of fats and oils is one of the advantages. If the double bonds are eliminated entirely with hydrogenation, the product is a hard brittle solid at room temperature. Shortening and margarine are typical examples. A wide range of fats and oils products can be produced with the hydrogenation process depending upon the conditions used, the starting oils, and the degree of saturation or isomerization.

To obtain good-quality fats and oils with physical refining, it is essential to have a phosphorous content lower than 5 ppm before steam stripping.

The degummed-bleached oils are vacuum stripped. This process encompasses the deodorization process, applied after the alkali routes, as well as physical refining. Deodorization, the last major processing step during which the FFA can be removed, is a vacuum-steam distillation process (1-2 mbar of residual pressure) at elevated temperature (180-240° C.) during which FFAs and minute levels of odoriferous materials, mostly arising from oxidation, are removed to obtain a bland and odourless oil. In order to volatilise the undesired high-boiling components, a deep vacuum and dilution with steam is applied so that the boiling temperature can be minimised.

The deodorization utilizes the differences in volatility between off-flavour and off-odor substances and the triglycerides.

The odoriferous substances, FFAs, aldehydes, ketones, peroxides, alcohols, and others organic compounds are concentrated in a deodorizer distillate. Efficient removal of these substances depends upon their vapour pressure, for a given constituent is a function of the temperature and increases with the temperature.

As usually the last stage in the refining process, deodorization has an important effect an overall refined oil quality and distillate composition. Its main purposes are giving a bland taste and smell, low FFA content, high oxidative stability and light and stable colour. Because of the need of a rather high temperature to remove the undesired components, unwanted side effects are, isomerisation of double bond, polymerisation, intra-esterification and degradation of vitamins and antioxidants. New dry condensing (steam is condensed into ice) vacuum systems capable of reaching a very low operating pressure in the deodorizer were introduced (close to 0.1 kPa). This progress allows a reduction of the deodorization temperature without affecting the stripping efficiency in a negative way. In order to minimise the time that the oil is at high temperature, deodorizers can operate at dual temperatures to reach the best compromise between required residence time for deodorizing (at moderate temperature) and heat bleaching and final stripping at high temperature.

Deodorizer distillate is the material collected from the steam distillation of edible oils. The distillate from physically refined oils consists mainly of FFAs with low levels of unsaponifiable components. The concentration of FFA can be improved from typical 80% up to 98% by applying double condensing system that produces an enriched FFA cut. The distillate can be used as a source of industrial fatty acids or mixed with the fuel oil used to fire the steam boilers.

A physical refining will be preferred due to higher remaining FFA content in refined oils before steam stripping.

Chemical Refining

As applied to crude oils, it includes degumming (removal of phospholipids), neutralization (removal of free fatty acids), bleaching (decolourisation) and deodorization (FIG. 1).

Degumming involves for instance the addition of water to hydrate any gums present, followed by centrifugal separation. Non-hydratable gums are removed by converting them first to a hydratable form using phosphoric or citric acid, followed by the addition of water and centrifugation. Acid degumming can also be used (see the description above).

The following step is neutralisation in which an aqueous alkali, typically caustic soda or sodium carbonate, is sprayed into the oil which has been preheated to around 75-95° C. The alkali reacts with free fatty acids in the oil to form soaps, which are separated by settling or centrifugation. Selection of the aqueous alkali strength, mixing time, mixing energy, temperature, and the quantity of excess caustic all have an important impact on making the chemical refining process operate efficiently and effectively. A drying step may be incorporated after neutralisation to ensure the complete removal of the added water. The soap can be used as such or can be hydrolysed (acidulation) with sulphuric acid into the corresponding FFA.

The neutralised oil is bleached to remove colouring matter (such as carotenoids) and other minor constituents, such as oxidative degradation products or traces of metals. Bleaching uses activated fuller's earth with treatments typically in the 90-130° C. range for 10-60 minutes. The earth is sucked into the oil under vacuum and is removed by filtration.

The bleached oil is steam distilled at low pressure to remove volatile impurities including undesirable odours and flavours. This process, known as deodorisation, takes place in the temperature range of 180-270° C. and may last 15 minutes to five hours depending upon the nature of the oil, the quantity, and the type of equipment used.

Fractionation Treatment into Phases L and S

Figure 2:
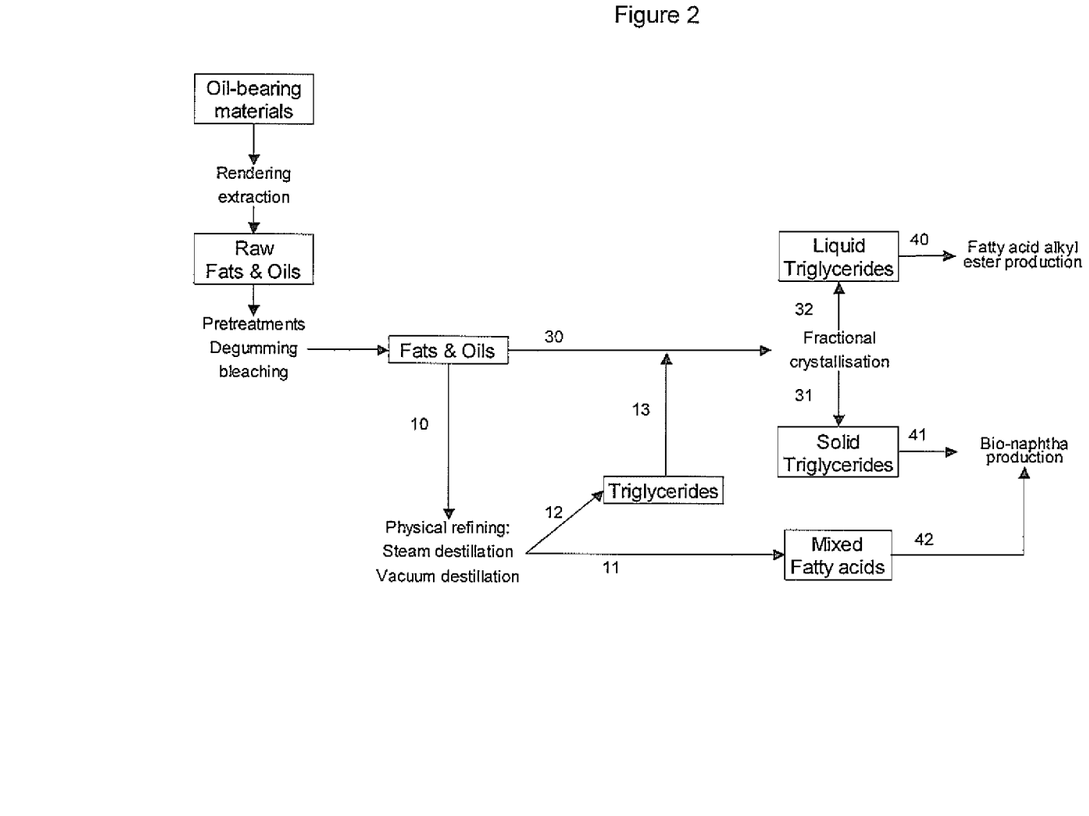
FIG. 2 illustrates separation of refined natural triglycerides and fatty acids in a liquid fraction and a solid fraction, namely phases L and S, respectively.

FIG. 2 illustrates where refined natural triglycerides and fatty acids are separated in a liquid fraction and a solid fraction, namely phases L and S, respectively.

The fractionation according to the present invention or "dry fractionation" or "dry winterization" is the removal of solids by controlled crystallization and separation techniques involving the use of solvents or dry processing (sometimes also referred to as dewaxing). It relies upon the difference in melting points to separate the oil fractions. The fractionation process has two main stages, the first being the crystallization stage. Crystals grow when the temperature of the molten fat & oil or its solution is lowered, and their solubility at the final or separation temperature determines the triglycerides composition of the crystals formed as well as their mother liquor. Separation process is the second step of fractionation. Several options have been reported, such as vacuum filters, centrifugal separators, conical screen-scroll centrifuges, hydraulic presses, membrane filter presses, or decanters with each their own advantages and drawbacks.

Fractionation can occur spontaneously during storage or transport, and this forms the basis of the dry fractionation process. This process is the oldest process type and thanks to steadily improved separation methods it has become competitive on product quality grounds with other, more expensive processes, such as solvent and detergent fractionation.

Fractionation can also been carried out in presence of solvents, like paraffin's, alkyl-acetates, ethers, ketons, alcohols or chlorinated hydrocarbons. The use of solvents accelerates the crystallisation and allows to crystallise more material before the slurry can no more be handled.

The term "fractional crystallisation" will be used throughout this text and encompasses winterisation, dry fractionation and solvent fractionation.

Raw fats and oils are preatreated e.g. by degumming and bleaching, then they can be physically refined (10) by way of example by vacuum or steam distillation to produce triglycerides (12) at bottoms and mixed fatty acids at overhead (11). optionally all or a part of the preatreated fats and oils (30) is mixed with the triglycerides (13) and sent to the fractional crystallisation to recover solid and liquid triglycerides as explained above. The solid triglycerides (41) and the mixed fatty acids (11) and (42) are sent to the bio naphtha production. The liquid triglycerides (40) are sent to the fatty acid alkyl ether production, optionally to make bio diesel.

Obtention of Bio-Diesel from Phase L

Methylesters are produced from liquid triglycerides by transesterification with alcohols. If an oil or fat containing a high content in free fatty acids is used to produce bio-destillates, the alkali catalyst typically used to accelerate the reaction will react with this acid to form soap, according to the following reaction:

This reaction is undesirable because it binds the catalyst into a form that does not contribute anymore to accelerating the reaction. Excessive soap in the products can inhibit later processing of the bio-distillates, including glycerol separation and water washing. The formation of water, according to the reaction above is also a problem. When water is present, particularly at high temperatures, it can hydrolyze the triglycerides to diglycerides and form a free fatty acid, according to the following reaction:

When water is present in the reaction, it generally manifests itself through excessive soap production. The soaps of saturated fatty acids tend to solidify at ambient temperatures and form a semi-solid mass very difficult to recover.

A technical solution proposed to produce bio-destillates from feedstock with high FFA content is to start with an acid catalyzed interesterification with additional glycerol to convert FFA's into glycerides prior to the basic transesterification. This process causes a redistribution of the fatty acids on the glycerol fragment of the molecule. This rearrangement process does not change the composition of the fatty acids from the starting materials. Interesterification may be accomplished by chemical or enzymatic processes. Chemical interesterification is a process by which fatty acids are randomly distributed across the glycerol backbone of the triglycerides. This process is carried out by blending the desired oils, drying them and adding a catalyst such as sodium methoxide. When the reaction is complete, the catalyst is neutralized and the rearranged product is washed, bleached, and deodorized to give a final oil product with different characteristics than the original oil blends. The second process is enzymatic interesterification. This process rearranges the fatty acids on the glycerol backbone of the triglycerides through the use of an enzyme. Higher temperature will results in inactivation of the enzyme. After interesterification, the oil is deodorized to make finished oil products.

Chemical conversion of the oil to its corresponding fatty ester is called transesterification. This bio-distillate reaction requires a catalyst such as sodium hydroxide to split the oil molecules from the triglycerides and an alcohol to combine with separated acyl-moiety. The main byproduct is glycerol. One popular process for producing bio-destillates from fats and oils is transesterification of triglyceride with methanol to make methyl esters of straight chain fatty acid according to the following reaction:

The transesterification reaction proceeds well in the presence of some homogeneous catalysts such as potassium hydroxide, sodium hydroxide, potassium-methoxide, sodium-methoxide and sulphuric acid, or heterogeneous catalysts such as metal oxides or carbonates.

Transesterification is the process of exchanging the alkoxy group of an ester compound by another alcohol. These reactions are often catalyzed by the addition of a base and acid. Bases can catalyze the reaction by removing a proton from the alcohol, thus making it more reactive, while acids can catalyze the reaction by donating a proton to the carbonyl group, thus making it more reactive.

Vegetable oils can be transesterified by heating them with a large excess of anhydrous methanol and a catalyst. More information about transesterification with catalyst using alkali's, acids or enzymes can be found in literature ("The Biodiesel Handbook", Gerhard Knothe, Jon Van Gerpen, Jurgen Krahl, 2005 AOCS Press).

Obtention of Bio-Naphtha from Phase S

Three options exist to convert phase S fats & oils into LPG and naphtha-like hydrocarbons that can be used for the steam-cracking in order to produce light olefins, dienes and aromatics. These are summarised in table 3.

TABLE 3

| Feedstock | Process | Catalyst/intermediate compounds |
|---|---|---|
| Triglycerides, eventually containing fatty acids | Catalytic Hydrodeoxygenation | Supported Ni, Mo, Co, NiW, NiMo, CoMo, NiCoW, NiCoMo, NiMoW and CoMoW oxides or sulphides |
| Fatty acids | Catalytic Decarboxylation | Supported group 10 (Ni, Pt, Pd) or group 11 (Cu, Ag) metals or alloys Basic oxides or mixed basic oxides |
| Fatty acids Soaps | Thermal Decarboxylation | Soaps of alkali, alkaline earth, lanthanides or group 12 or 13 |

The first option consists in hydrodeoxygenation, which removes the oxygen atoms from the fats & oils. This can be done on the triglycerides as such, the triglycerides containing FFA's or on only FFA's. Hydrodeoxygenation of fats & oils has been reported in 1989 (W. H. Craig and D. W. Soveran, "Production of hydrocarbons with relatively high cetane rating", U.S. Pat. No. 4,992,605 and Gusmao J, Brodzki D, Djéga-Mariadassou G, Frety R., "Utilization of vegetable oils as an alternative source for diesel-type fuel: Hydrocracking on reduced Ni/SiO2 and sulphided Ni—Mo/γ—Al2O3", Cat. Today 1989 (5) 533) in which conventional CoMo or NiMo sulphided catalysts are used. These catalysts are well known in hydrodesulphurization and are know to catalyze also hydrodeoxygenation (E. Furimsky, Applied Catalysis A, General, 199, pages 147-190, 2000).

Hydrodeoxygenation of fats & oils is preferentially done in continuous fixed bed reactors, continuous stirred tank reactors or slurry type reactors containing solid catalyst that can be selected among Ni, Mo, Co or mixtures like NiW, NiMo, CoMo, NiCoW, NiCoMo, NiMoW and CoMoW oxides or sulphides as catalytic phase, preferably supported on high surface area carbon, alumina, silica, titania or zirconia. It is preferred that the support for the catalytic active phase exhibit low acidity, preferable neutral or basic in order to avoid hydro-isomerisation reactions that would result in branched paraffin's and cracking at elevated temperature and pressure in the presence of hydrogen. Temperature ranges from 200 to 500° C., pressure from 1 MPa to 10 MPa (10 to 100 bars) and hydrogen to oil feed ratio from 100 to 2000 Nm$^3$/m$^3$ of liquid. For optimum performance and stable continuous operation, it is preferred that the active metal component of the catalyst is in the form of sulfides. Thereto, it is preferred that traces amounts of decomposable sulphur compounds are present or added on purpose to the feedstock in order to keep the metal sulphide in its sulphide state. By way of example, these sulphur compounds can be $H_2S$, COS, $CS_2$, mercaptans (e.g. methylsulfide), thio-ethers (e.g. DiMethylSulfide), disulfides (e.g. DiMethyldiSulfide), thiophenic and tetrahydrothiophenic compounds.

Under hydrodeoxygenation conditions several reactions occur. The easiest is the hydrogenation of the double bonds in the alkyl-chain. The more difficult reaction is the removal of oxygen atoms from the C—O bonds. Both the carboxyl-group of the fatty acid as the hydroxyl-group of the glycerol-moiety are hydrodeoxygenated. This results in the production of linear paraffin, resulting from the fatty acid and in propane, resulting from glycerol. Depending on the conditions (catalyst, temperature, hydrogen etc), the carboxyl-group can also be decomposed into CO/CO$_2$ (decarboxylation) and which on their turn can be even further hydrogenated into methane. These hydrodeoxygenation reactions consume a lot of hydrogen.

As way of example is given the equation for triolein hydrodeoxygenation:

$$[C_{18}H_{33}O]_3C_3H_5O_3 + 15H_2 \rightarrow 3C_{18}H_{38} + C_3H_8 + 6H_2O$$

Hydrodeoxygenation of fatty acids:

$$R-CH_2-CH_2-COOH + 3H_2 \rightarrow R-CH_2-CH_2-CH_3 + 2H_2O$$

Further hydrogenation of the intermediate CO/CO$_2$ can occur depending on the amount of available hydrogen, the catalyst and the operating conditions:

$$CO + 3H_2 \rightarrow CH_4 + H_2O$$

$$CO_2 + 4H_2 \rightarrow CH_4 + 2H_2O$$

The second option consists in decarboxylation or decarbonylation of fatty acids. These fatty acids can be obtained from fats & oils by physical refining (including steam/vacuum distillation), by (steam) splitting of triglycerides or by splitting of soaps (acidulation) using acids. Decarboxylation of carboxylic acids has been reported in 1982 (W. F. Maier, Chemische Berichte, 115, pages 808-812, 1982) over Pd/SiO$_2$ and Ni/Al$_2$O$_3$ catalysts in the gas phase. A highly selective decarboxylation has been reported in 2005 (I. Kubickova, Catalysis Today, 106, pages 197-200, 2005 and M. Snare, Industrial Engineering, Chemistry Research, 45, p. 5708-5715, 2006) using transition metal catalysts. Palladium based catalysts exhibit the highest selectivity towards decarboxylation. Carboxylic acids can also be decarboxylated under catalytic conditions using basic catalyst, like MgO, ZnO and mixed basic oxides (A. Zhang*, Q. Ma, K. Wang, X. Liu, P. Shuler, Y. Tang, "Naphthenic acid removal from crude oil through catalytic decarboxylation on magnesium oxide", Applied Catalysis A: General 303, p. 103, 2006; A. More, John R. Schlup, and Keith L. Hohn "Preliminary Investigations of the Catalytic Deoxygenation of Fatty Acids", AIChe, The 2006 annual meeting, San Francisco and B. Kitiyanan, C. Ung-jinda, V. Meeyoo, "Catalytic deoxygenation of oleic acid over ceria-zirconia catalysts", AIChe The 2008 annual meeting).

The following reactions can occur:
Decarboxylation:

$$R-CH_2-CH_2-COOH \rightarrow R-CH_2-CH_3 + CO_2$$

Decarbonylation:

$$R-CH_2-CH_2-COOH \rightarrow R-CH=CH_2 + CO + H_2O$$

Decarboxylation is preferentially done in presence of solid catalyst in batch type tank reactors, continuous fixed bed type reactors, continuous stirred tank reactors or slurry type reactors. The catalyst can be selected among Ni, Mo, Co or mixtures like NiW, NiMo, CoMo, NiCoW, NiCoMo, NiMoW and CoMoW oxides or sulphides as catalytic phase, preferably supported on high surface area carbon, alumina, silica, titania or zirconia or group 10 (Ni, Pt and Pd) and group 11 (Cu and Ag) metals or alloy mixtures supported on high surface area carbon, magnesia, zinc-oxide, spinels (Mg$_2$Al$_2$O$_4$, ZnAl$_2$O$_4$), perovskites (BaTiO$_3$, ZnTiO$_3$), calciumsilicates (like xonotlite), alumina, silica or silica-alumina's or mixtures of the latter. It is preferred that the support for the catalytic active phase exhibit low acidity, preferable neutral or basic in order to avoid hydro-isomerisation reactions that would result in branched paraffin's and cracking. Decarboxylation can also be carried out on basic oxides, like alkaline oxides, alkaline earth oxides, lanthanide oxides, zinc-oxide, spinels (Mg$_2$Al$_2$O$_4$, ZnAl$_2$O$_4$), perovskites (BaTiO$_3$, ZnTiO$_3$), calciumsilicates (like xonotlite), either as bulk material or dispersed on neutral or basic carriers, on basic zeolites (like alkali or alkaline earth low silica/alumina zeolites obtained by exchange or impregnation).

Although, the decarboxylation reaction does not require hydrogen, it is preferred that the decarboxylation is done in presence of hydrogen that will stabilise the catalytic activity by removing strongly adsorbed unsaturated species (for instance when decarbonylation is the prevalent reaction pathway) from the catalyst surface by hydrogen-addition reactions. The presence of hydrogen can also hydrogenate the double bonds present in the acyl-moiety of the fatty acid in order to obtain paraffinic reaction products from the decarboxylation process. The decarboxylation of the fatty acids can be carried out at 100 to 550° C. in absence or presence of hydrogen at pressures ranging from 0.01 up to 10 MPa. The hydrogen to feedstock ratio is from 0 to 2000 Nl/l.

Other reactions that can occur under the decarboxylation conditions are:

$$R-CH=CH_2+H_2 \rightarrow R-CH_2-CH_3$$

Hydrodeoxygenation of fatty acids:

$$R-CH_2-CH_2-COOH+3H_2 \rightarrow R-CH_2-CH_2-CH_3+2H_2O$$

Further hydrogenation of the intermediate $CO/CO_2$ can occur depending on the amount of available hydrogen, the catalyst and the operating conditions:

$$CO+3H_2 \rightarrow CH_4+H_2O$$

$$CO_2+4H_2 \rightarrow CH_4+2H_2O$$

A third option to obtain bio-naphtha from fats & oils is through the thermal decarboxylation of soaps of fatty acids. The soaps can be obtained from the chemical refining of fats & oils by neutralisation, producing refined triglycerides and soaps, by neutralisation of fatty acids obtained after (steam) splitting of fats & oils or by direct saponification of fats & oils using basic oxides or basic hydroxides, producing a soap and glycerol.

Decarboxylation has been carried out by decomposition of fatty acids in hot compressed water with the aid of alkali-hydroxides, resulting in the production of alkanes and $CO_2$ (M. Watanabe, Energy Conversion and Management, 47, p. 3344, 2006). Calcium-soaps of Tung oil have been reported to decompose by distillation as early as 1947 (C. C, Chang, S. W, Wan, "China's Motor Fuels from Tung Oil", Ind. Eng. Chem., 39 (12), p. 1543, 1947; Hsu, H. L., Osbum, J. O., Grove, C. S., "Pyrolysis of the calcium salts of fatty acids", Ind. Eng. Chem. 42 (10), p. 2141, 1950; Craveiro, A. A.; Matos, F. J. A.; Alencar, J. W.; Silveira E. R. Energia: Fontes Alternativas 3, p. 44, 1981; A. Demirbas, "Diesel fuel from vegetable oil via transesterification and soap pyrolysis", *Energy Sources* 24 9, p. 835, 2002).

The preferred soaps are those made of alkaline, alkaline earth, lanthanide, zinc or aluminium cations. The thermal decarboxylation of soap can be carried out by heating until the molten soap starts to decompose into the corresponding paraffin's or olefins and the corresponding metal-carbonate or metal-oxide/hydroxide and $CO_2$. Without willing to be bound to any theory, it is believed that the following overall reactions occur:

$$[R-CH_2-CH_2-COO^-]_xM^{x+}+xH_2O \rightarrow xR-CH_2-CH_3+M[HCO_3]_x,$$

$$M[HCO_3]_x \leftarrow \Theta M[OH]_x+CO_2$$

It is preferred that the thermal decomposition of the soaps is carried out in the presence of liquid, supercritical or vaporous water.

Steamcracking

Steamcrackers are complex industrial facilities that can be divided into three main zones, each of which has several types of equipment with very specific functions: (i) the hot zone including: pyrolysis or cracking furnaces, quench exchanger and quench ring, the columns of the hot separation train (ii) the compression zone including: a cracked gas compressor, purification and separation columns, dryers and (iii) the cold zone including: the cold box, de-methaniser, fractionating columns of the cold separation train, the $C_2$ and $C_3$ converters, the gasoline hydrostabilization reactor Hydrocarbon cracking is carried out in tubular reactors in direct-fired heaters (furnaces). Various tube sizes and configurations can be used, such as coiled tube, U-tube, or straight tube layouts. Tube diameters range from 1 to 4 inches. Each furnace consists of a convection zone in which the waste heat is recovered and a radiant zone in which pyrolysis takes place. The feedstock-steam mixture is preheated in the convection zone to about 530-650° C. or the feedstock is preheated in the convection section and subsequently mixed with dilution steam before it flows over to the radiant zone, where pyrolysis takes place at temperatures varying from 750 to 950° C. and residence times from 0.05 to 0.5 second, depending on the feedstock type and the cracking severity desired. In an advantageous embodiment the residence time is from 0.05 to 0.15 second. The steam/feedstock (the steam/[hydrocarbon feedstock]) weight ratio is between 0.2 and 1.0 kg/kg, preferentially between 0.3 and 0.5 kg/kg. In an advantageous embodiment the steam/feedstock weight ratio is between 0.2 and 0.45 and preferably between 0.3 and 0.4. For steamcracking furnaces, the severity can be modulated by: temperature, residence time, total pressure and partial pressure of hydrocarbons. In general the ethylene yield increases with the temperature while the yield of propylene decreases. At high temperatures, propylene is cracked and hence contributes to more ethylene yield. The increase in severity thus obtained leads to a moderate decrease in selectivity and a substantial decrease of the ratio $C_3=/C_2=$. So high severity operation favors ethylene, while low severity operation favors propylene production. The residence time of the feed in the coil and the temperature are to be considered together. Rate of coke formation will determine maximum acceptable severity. A lower operating pressure results in easier light olefins formation and reduced coke formation. The lowest pressure possible is accomplished by (i) maintaining the output pressure of the coils as close as possible to atmospheric pressure at the suction of the cracked gas compressor (ii) reducing the pressure of the hydrocarbons by dilution with steam (which has a substantial influence on slowing down coke formation). The steam/feed ratio must be maintained at a level sufficient to limit coke formation.

Effluent from the pyrolysis furnaces contains unreacted feedstock, desired olefins (mainly ethylene and propylene), hydrogen, methane, a mixture of $C_4$'s (primarily isobutylene and butadiene), pyrolysis gasoline (aromatics in the $C_6$ to $C_8$ range), ethane, propane, di-olefins (acetylene, methyl acetylene, propadiene), and heavier hydrocarbons that boil in the temperature range of fuel oil. This cracked gas is rapidly quenched to 338-510° C. to stop the pyrolysis reactions, minimize consecutive reactions and to recover the sensible heat in the gas by generating high-pressure steam in parallel transfer-line heat exchangers (TLE's). In gaseous feedstock based plants, the TLE-quenched gas stream flows forward to a direct water quench tower, where the gas is cooled further with recirculating cold water. In liquid feedstock based plants, a prefractionator precedes the water quench tower to condense and separate the fuel oil fraction from the cracked gas. In both types of plants, the major portions of the dilution steam and heavy gasoline in the cracked gas are condensed in the water quench tower at 35-40° C. The water-quench gas is subsequently compressed to about 25-35 Bars in 4 or 5 stages. Between compression stages, the condensed water and light gasoline are removed, and the cracked gas is washed with a caustic solution or with a regenerative amine solution, followed by a caustic solution, to remove acid gases ($CO_2$, $H_2S$ and $SO_2$). The compressed cracked gas is dried with a desiccant and cooled with propylene and ethylene refrigerants to cryogenic temperatures for the subsequent product fractionation: Front-end demethanization, Front-end depropanization or Front-end deethanization.

In a front-end demethanization configuration, tail gases (CO, $H_2$, and $CH_4$) are separated from the $C_2$+ components first by de-methanization column at about 30 bars. The bottom product flows to the de-ethanization, of which the overhead product is treated in the acetylene hydrogenation unit and further fractionated in the $C_2$ splitting column. The bottom product of the de-ethanization goes to the de-propanization, of which the overhead product is treated in the methyl acetylene/propadiene hydrogenation unit and further fractionated in the $C_3$ splitting column. The bottom product of the de-propaniser goes to the de-butanization where the $C_4$'s are separated from the pyrolysis gasoline fraction. In this separation sequence, the $H_2$ required for hydrogenation is externally added to $C_2$ and $C_3$ streams. The required $H_2$ is typically recovered from the tail gas by methanation of the residual CO and eventually further concentrated in a pressure swing adsorption unit.

Front-end de-propanization configuration is used typically in steamcrackers based on gaseous feedstock. In this configuration, after removing the acid gases at the end of the third compression stage, the $C_3$ and lighter components are separated from the $C_{4+}$ by de-propanization. The de-propanizer $C_3$- overhead is compressed by a fourth stage to about 30-35 bars. The acetylenes and/or dienes in the $C_3$- cut are catalytically hydrogenated with $H_2$ still present in the stream. Following hydrogenation, the light gas stream is de-methanized, de-ethanized and $C_2$ split. The bottom product of the de-ethanization can eventually be $C_3$ split. In an alternative configuration, the $C_3$- overhead is first de-ethanised and the $C_2$- treated as described above while the $C_3$'s are treated in the $C_3$ acetylene/diene hydrogenation unit and $C_3$ split. The $C_4$+ de-propanizer bottom is de-butanized to separate $C_4$·s from pyrolysis gasoline.

There are two versions of the front-end de-ethanization separation sequence. The product separation sequence is identical to the front-end de-methanization and front-end depropanization separation sequence to the third compression stage. The gas is de-ethanized first at about 27 bars to separate $C_2$- components from $C_3$+ components. The overhead $C_2$- stream flows to a catalytic hydrogenation unit, where acetylene in the stream is selectively hydrogenated. The hydrogenated stream is chilled to cryogenic temperatures and de-methanized at low pressure of about 9-10 bars to strip off tail gases. The $C_2$ bottom stream is split to produce an overhead ethylene product and an ethane bottom stream for recycle. In parallel, the $C_3$+ bottom stream from the front-end de-ethanizer undergoes further product separation in a de-propaniser, of which the overhead product is treated in the methyl acetylene/propadiene hydrogenation unit and further fractionated in the $C_3$ splitting column. The bottom product of the de-propaniser goes to the de-butanization where the $C_4$'s are separated from the pyrolysis gasoline fraction. In the more recent version of the front-end de-ethanization separation configuration, the cracked gas is caustic washed after three compression stages, pre-chilled and is then de-ethanized at about 16-18 bars top pressure. The net overhead stream ($C_2$–) is compressed further in the next stage to about 35-37 bars before it passes to a catalytic converter to hydrogenate acetylene, with hydrogen still contained in the stream. Following hydrogenation, the stream is chilled and de-methanized to strip off the tail gases from the $C_2$ bottom stream. The $C_2$·s are split in a low pressure column operating at 9-10 bars pressure, instead of 19-24 bars customarily employed in high pressure $C_2$ splitters that use a propylene refrigerant to condense reflux for the column. For the low-pressure $C_2$ splitter separation scheme, the overhead cooling and compression system is integrated into a heat-pump, open-cycle ethylene refrigeration circuit. The ethylene product becomes a purged stream of the ethylene refrigeration recirculation system.

The ethane bottom product of the $C_2$ splitter is recycled back to steam cracking. Propane may also be re-cracked, depending on its market value. Recycle steam cracking is accomplished in two or more dedicated pyrolysis furnaces to assure that the plant continues operating while one of the recycle furnaces is being decoked.

Many other variations exist of the above-described configurations, in particular in the way the undesired acetylene/dienes are removed from the ethylene and propylene cuts.

Figure 3:
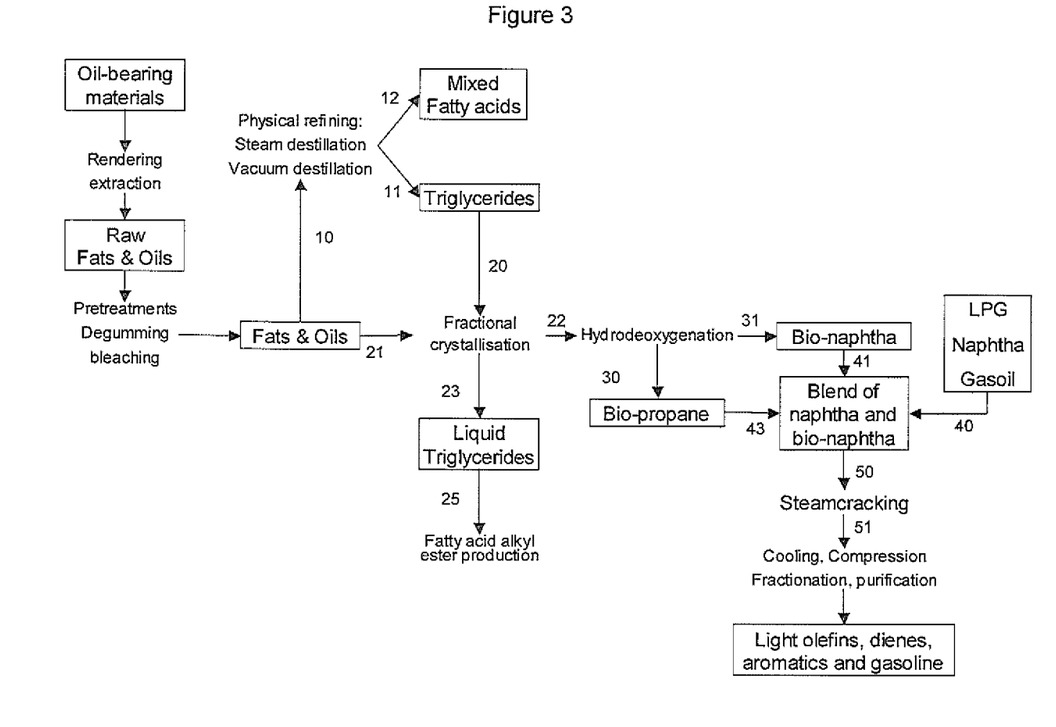
FIG. 3 illustrates the physical refinement of fats and oils by vacuum distillation or steam distillation to recover mixed fatty acids as overhead product and triglycerides as bottom product.
Figure 4:
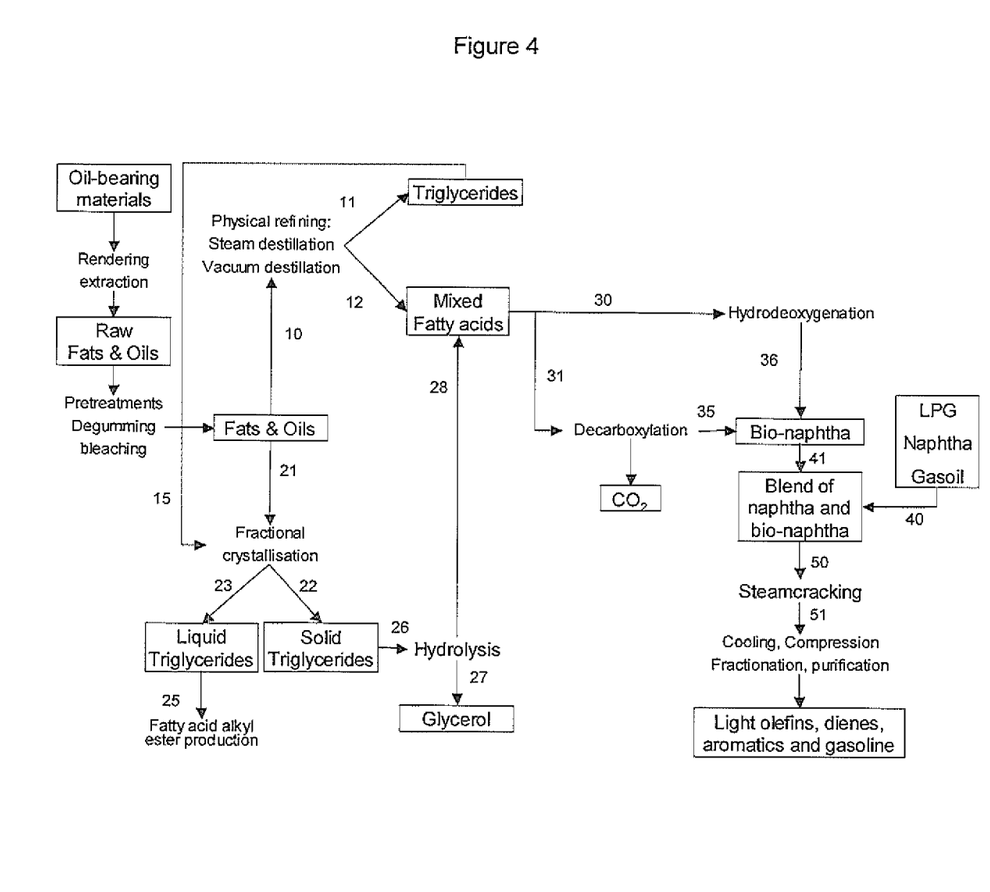
FIG. 4 illustrates another embodiment of physical refinement of fats and oils by vacuum distillation or steam distillation to recover mixed fatty acids as overhead product and triglycerides as bottom product.
Figure 5:
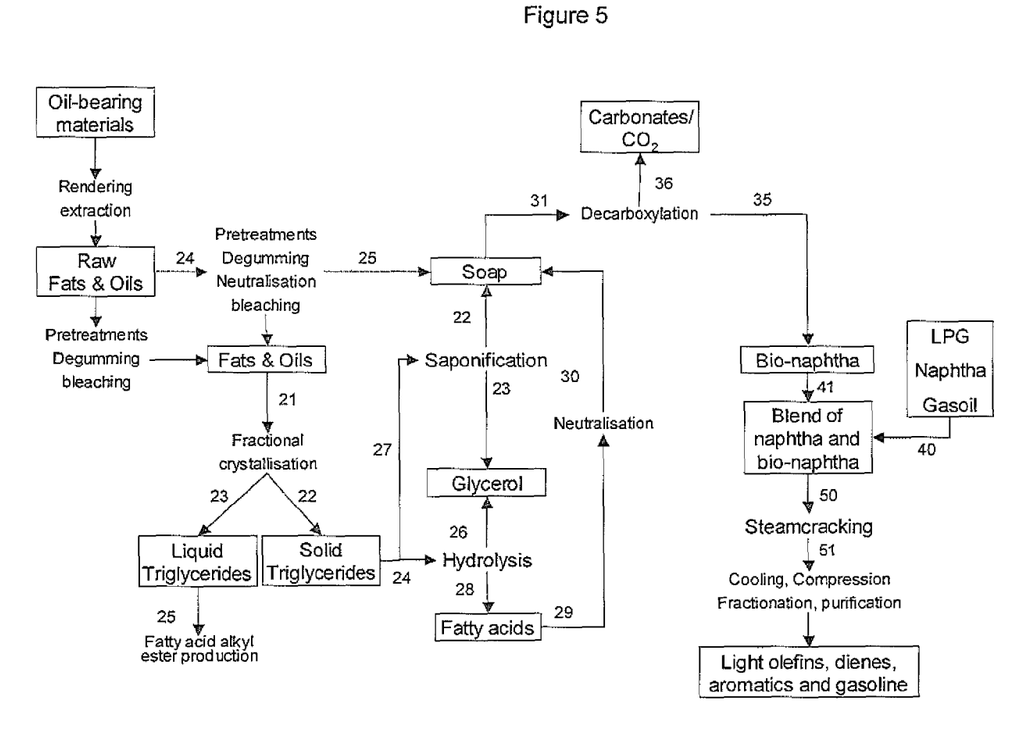
FIG. 5 illustrates an embodiment in which fats and oils are fractional crystallised and the phase S fraction is saponificated to recover soap and glycerol.

The different embodiments are represented in FIGS. 3 to 5.

In a first embodiment (FIG. 3), Fats & Oils are physically refined by vacuum distillation or steam distillation (10) to recover the mixed fatty acids (12) as overhead product and the triglycerides (11) as bottom product. Either the fats & oils, eventually still containing free fatty acids (21) or the physically refined triglycerides (20) acids are fractional crystallised (according to FIG. 2), resulting in a phase S and a phase L fraction and the phase S can be sent to a hydrodeoxygenation section (22) where they are converted into bio-naphtha (31) and bio-propane (30). This bio-naphtha (41) and bio-propane (43) are sent to the to steamcracking (50) or blended with fossil LPG, naphtha or gasoil (40) and hence the blend is streamcracked (50). The products of the steamcracking are cooled, compressed, fractionated and purified (51). This results in light olefins (ethylene, propylene and butenes), dienes (butadiene, isoprene, (di)cyclopentadiene and piperylenes), aromatics (benzene, toluene and mixed xylenes) and gasoline as main components. The phase L, obtained from the fractional crystallisation (23) is sent to biodiesel production section (25).

In a second embodiment (FIG. 4), Fats & Oils are physically refined by vacuum distillation or steam distillation (10) to recover the mixed fatty acids (12) as overhead product and the triglycerides (11) as bottom product. Optionally, the triglycerides are sent to the fractional crystallisation section (15). The fats & oils, and optionally the triglycerides, obtained from the physical refining (15) are fractional crystallised (21) and the phase S fraction is optionally hydrolysed (26) to produce mixed fatty acids (28) and glycerol (27). The mixed fatty acids can be sent (30) to a hydrodeoxygenation section where they are converted into bio-naphtha (36) or alternatively they can be sent to the decarboxylation section (31) where they are converted into bio-naphtha (35). This bio-naphtha (41) is sent to the to steamcracking (50) or blended with fossil LPG, naphtha or gasoil (40) and hence the blend is streamcracked (50). The products of the steamcracking are cooled, compressed, fractionated and purified (51). This results in light olefins (ethylene, propylene and butenes), dienes (butadiene, isoprene, (di)cyclopentadiene and piperylenes), aromatics (benzene, toluene and mixed xylenes) and gasoline as main components. The phase L, obtained from the fractional crystallisation (23) is sent to biodiesel production section (25).

In a third embodiment (FIG. 5), fats & Oils are fractional crystallised (21) and the phase S fraction saponificated (27) to recover the soap (22) and glycerol (23). Optionally phase S, obtained by fractional crystallisation of fats & Oils can be hydrolysed (24) to produce mixed fatty acids (28) and glycerol (26). Alternatively, soap (25) can be obtained during a chemical refining step of raw fats & oils (24) by the neutralisation step. Still another source of soap (30) is via neutralisation (29) of fatty acids, obtained by (steam) splitting (24) of fractional crystallised fats & oils, producing fatty acids (28) and glycerol (26). The soaps can be sent (31) to the decarboxylation section where they are converted into bio-naphtha (35) and metal-carbonates or $CO_2$ (36). This bio-naphtha (41) is sent to the to steamcracking (50) or blended with fossil LPG, naphtha or gasoil (40) and hence the blend is steamcracked (50). The products of the steamcracking are cooled, compressed, fractionated and purified (51). This results in light olefins (ethylene, propylene and butenes), dienes (butadiene, isoprene, (di)cyclopentadiene and piperylenes), aromatics (benzene, toluene and mixed xylenes) and gasoline as main components. The phase L, obtained from the fractional crystallisation (23) is sent to biodiesel production section (25).

EXAMPLES

Example 1

Hydrodeoxygenation of a Triglyceride Feed has been Evaluated Under the Following Conditions In an isothermal reactor, 10 ml of a hydrotreating catalyst composed of Molybdenum and Nickel supported on alumina (KF848 obtained from Albemarle) was loaded, the catalyst dried and pre-sulfurised under standard conditions with straightrun gasoil doped with DMDS. The hydrodeoxygenation of rapeseed is done at:

LHSV=1 h$^{-1}$
Inlet Temperature=320° C.
Outlet pressure=60 bars
H2/oil ratio=630 Nl/l
Feedstock=rapeseed doped with 1 wt % DMDS Table 4 shows a typical composition of the rapeseed oil.

The gas and liquid effluent are separated by means of a separator (gas/liquid) at atmospheric pressure. Gases are sent to a µ-GC analyser and liquids are sent to a sampler. The mass balance is around 99% and all product weights are calculated for 100 g of treated feed.

TABLE 4

Typical composition of rapeseed oil

| Components | wt % |
|---|---|
| tetradecanoate | 0.1 |
| hexadecenoate | 0.2 |
| hexadecanoate | 4.8 |
| heptadecanoate | 0.1 |
| octadecadienoate | 20.6 |
| octadecenoate | 61.3 |
| octadecatrienoate | 8.6 |
| octadecanoate | 1.8 |
| eisosenoate | 1.2 |
| eicosanoate | 0.7 |
| docosenoate | 0.3 |
| docosanoate | 0.3 |
| | 100 |

The total liquid effluent is biphasic and need a separation step. The organic phase was analyzed via GC-MS. A complete analysis is reported in table 5.

The liquid effluent is composed of 94.4 wt % of n-paraffins but it is composed of 99.94 wt % of interesting components, which could be sent to the naphthacracker.

TABLE 5

Material balance and complete GC analysis of hydrocarbon phase

| Feed | Products |
|---|---|
| 5.96 gr hydrogen | 6.48 gr CO2 |
| 100 gr rapeseed | 0.55 gr CO |
| | 3.52 H2 |
| | 5.98 gr propane |
| | 0.18 gr methane |
| | 2.77 gr water phase |
| | 85 gr hydrocarbon phase |

| Hydrocarbon phase composition | Wt % |
|---|---|
| C3 | 0.005 |
| n-paraffin's with $C_5$ to $C_{14}$ | 0.268 |
| other paraffin's with $C_5$ to $C_{14}$ | 0.238 |
| other C15 | 0.061 |
| n-C15 | 2.353 |
| other C16 | 0.100 |
| n-C16 | 2.754 |
| other C17 | 1.633 |
| n-C17 | 41.077 |
| other C18 | 2.108 |
| n-C18 | 44.344 |
| dodecyl-cyclohexane | 0.168 |
| tridecyl-cyclopentane | 0.110 |
| n-paraffin's with $C_{19}$ to $C_{35}$ | 3.599 |
| other paraffin's with $C_{19}$ to $C_{35}$ | 1.1 |
| >n-C35 | 0.013 |
| 2-butanone | 0.034 |
| Other oxygenates | 0.025 |
| Total | 100.00 |

94.4 wt % of the hydrocarbon phase are comprised of n-paraffin's that is high quality bio-naphtha feedstock for a steamcracker. About 0.059 wt % of remaining oxygenates are found in the hydrocarbon phase. That corresponds to 112 wppm O-atoms. Considering the 0 content in the triglyceride feed, that represents 10.86 wt % (or 108600 wppm O-atoms), resulting in a hydrodeoxygenation conversion of 99.89%.

Example 2 n-Paraffin's and conventional naphtha have been steamcracked under different severity conditions. Table 6 gives the results. It is evident from the results that such-obtained bio-naphtha are better feedstock for steamcracking compared to fossil naphtha.

Significant higher ethylene and propylene yields can be obtained whereas the methane make and the pyrolysis gasoline make is reduced with at least about 20%. The ultimate yield of HVC (High value Chemicals=H2+ethylene+propylene+butadiene+benzene) is above 70 wt %. Ethylene/Methane weight ratio is always above 3.

TABLE 6

|  | Naphtha | n-Decane | n-C15 | n-C20 | Naphtha | n-Decane | n-C15 | n-C20 |
|---|---|---|---|---|---|---|---|---|
| P/E | 0.59 | 0.44 | 0.50 | 0.49 | 0.50 | 0.39 | 0.44 | 0.44 |
| COT | 812 | 812 | 812 | 812 | 832 | 832 | 832 | 832 |
| S/HC | 0.35 | 0.35 | 0.35 | 0.35 | 0.35 | 0.35 | 0.35 | 0.35 |
| Summary | wt % (dry) | wt % (dry) | wt % (dry) | wt % (dry) | wt % (dry) | wt % (dry) | wt % (dry) | wt % (dry) |
| Hydrogen | 0.87 | 0.66 | 0.59 | 0.57 | 0.96 | 0.76 | 0.69 | 0.67 |
| Methane | 14.79 | 11.67 | 10.65 | 10.00 | 16.25 | 12.80 | 11.80 | 11.15 |
| Acetylene | 0.25 | 0.25 | 0.25 | 0.25 | 0.36 | 0.37 | 0.37 | 0.37 |
| Ethylene | 25.39 | 38.87 | 36.24 | 35.82 | 26.91 | 39.67 | 36.93 | 36.47 |
| Ethane | 4.09 | 6.58 | 6.07 | 5.84 | 3.89 | 6.10 | 5.62 | 5.42 |
| Methyl-Acetylene | 0.29 | 0.21 | 0.22 | 0.22 | 0.36 | 0.26 | 0.27 | 0.27 |
| Propadiene | 0.21 | 0.15 | 0.16 | 0.16 | 0.25 | 0.18 | 0.19 | 0.19 |
| Propylene | 15.10 | 17.29 | 18.08 | 17.63 | 13.48 | 15.59 | 16.28 | 15.91 |
| Propane | 0.51 | 0.73 | 0.69 | 0.66 | 0.44 | 0.62 | 0.59 | 0.57 |
| Vinyl-Acetylene | 0.04 | 0.04 | 0.04 | 0.04 | 0.05 | 0.06 | 0.07 | 0.07 |
| Butadiene | 4.61 | 5.96 | 6.88 | 7.30 | 4.41 | 5.79 | 6.49 | 6.79 |
| Butene (sum) | 4.86 | 2.99 | 3.34 | 3.43 | 3.67 | 2.12 | 2.34 | 2.38 |
| Butane (sum) | 0.08 | 0.14 | 0.12 | 0.12 | 0.06 | 0.11 | 0.09 | 0.09 |
| Total C5-C9's | 23.69 | 12.48 | 14.65 | 15.75 | 22.30 | 13.14 | 15.33 | 16.42 |
| Total C10+ | 5.17 | 1.93 | 1.96 | 2.15 | 6.53 | 2.38 | 2.86 | 3.18 |
| Carbon Oxide | 0.05 | 0.05 | 0.05 | 0.05 | 0.07 | 0.07 | 0.07 | 0.07 |
| Carbon Dioxide | 0.00 | 0.00 | 0.00 | 0.00 | 0.01 | 0.00 | 0.00 | 0.00 |
| Ultimate Ethylene | 28.67 | 44.14 | 41.09 | 40.49 | 30.02 | 44.55 | 41.43 | 40.80 |
| C2═ + C3═ | 43.77 | 61.43 | 59.17 | 58.12 | 43.51 | 60.14 | 57.71 | 56.70 |
| BENZENE | 8.27 | 5.35 | 6.46 | 7.05 | 9.42 | 6.55 | 7.77 | 8.39 |
| HVC's | 54.25 | 68.14 | 68.24 | 68.37 | 55.18 | 68.35 | 68.16 | 68.23 |
| Ultimate HVC's | 57.52 | 73.40 | 73.10 | 73.04 | 58.29 | 73.23 | 72.66 | 72.56 |

| Naphtha composition | wt % |
|---|---|
| Normal paraffins | 31.26 |
| Iso paraffins | 33.48 |
| Naphtenics | 28.1 |
| Aromatics | 7.16 |
| Olefins | 0 |
| Others | 0 |

P/E is the propylene/ethylene ratio
COT is the coil outlet temperature
S/HC is the ratio steam/hydrocarbon

What is claimed:

1. A process of using bio-naphtha as a direct feedstock of a steamcracker comprising:
   steamcracking a feedstock comprising bio-naphtha, wherein the bio-naptha is produced from a complex mixture of natural occurring fats & oils that has been subjected to a refining treatment for removing a major part of non-triglyceride and non-fatty acid components;
   wherein the bio-naphtha is optionally steamcracked together with bio-propane, or is optionally blended with at least a conventional feedstock selected among LPG, naphtha and gasoil;
   obtaining cracked products including bio-ethylene, bio-propylene, bio-butadiene, bio-isoprene, bio-cyclopentadiene and bio-piperylenes, bio-benzene, bio-toluene, bio-xylene, bio-gasoline, or combinations thereof.

2. The process of claim 1, wherein said feedstock is mixed with steam in a ratio of 0.2 to 1.0 kg steam per kg feedstock and the mixture is heated up to a temperature of 750-950° C. at a residence time of 0.05 to 0.5 seconds.

3. The process of claim 1, wherein the cracked products have an ethylene to methane weight ratio of at least 3.

4. The process of claim 2, wherein the feedstock is mixed with the steam at a ratio of 0.3 to 0.5 kg steam per kg feedstock.

5. The process of claim 1, wherein the bio-propane is also produced from the complex mixture of natural occurring fats & oils.

6. The process of claim 1, wherein subjecting the complex mixture to the refining treatment for removing the major part of the non-triglyceride and non-fatty acid components forms refined oils, and wherein the process of producing the bio-naptha further comprises subjecting the refined oils to a fractionation step for obtaining:
   an unsaturated or substantially unsaturated, liquid or substantially liquid triglyceride part (phase L); and a saturated or substantially saturated, solid or substantially solid triglyceride part (phase S);
   wherein said phase L is transformed into alkyl-esters as bio-diesel by a transesterification;
   wherein said phase S is transformed into linear or substantially linear paraffins as the bio-naphtha by an hydrodeoxygenation; or wherein from said phase S are obtained fatty acids that are transformed into linear or substantially linear paraffins as the bio-naphtha by hydrodeoxygenation or decarboxylation of the free fatty acids; or wherein from said phase S are obtained fatty acids soaps that are transformed into linear or substantially linear paraffins as the bio-naphtha by decarboxylation of the soaps.

7. The process of claim 6, wherein said fatty acids are obtained by physical refining, including a steam distillation or vacuum distillation of fats & oils, or said fatty acids are obtained by hydrolysis of triglycerides of the fats & oils, or said fatty acids are obtained by acidulation of soaps.

8. The process of claim 6, wherein said refined oils are fractioned into said phases L and S by a fractional crystallisation method which consists in a controlled cooling down during which the triglycerides of said complex mixture with substantially saturated acyl-moieties crystallize and precipitate from the mixture forming said phase S, while the triglycerides with substantially unsaturated acyl-moieties remain liquid forming said phase L, both phases being then separated by simple filtration or decantation or centrifugation.

9. The process of claim 6, wherein said phase L is transesterified with a $C_1$-$C_5$ monofunctional alcohol in order to produce alkyl fatty esters as bio-diesel and glycerol.

10. The process of claim 6, wherein said fatty acid soaps are obtained by saponification of fats & oils or by the chemical refining, including neutralisation of free fatty acids, present in the fats & oils or neutralisation of fatty acids, obtained from hydrolysis of the fats & oils.

11. The process of claim 6, wherein said phase S is transformed into linear or substantially linear paraffins as the bio-naphtha together with the bio-propane by hydrodeoxygenation in the presence of hydrogen and of at least one catalyst selected among Ni, Mo, Co, NiW, NiMo, CoMo, NiCoW, NiCoMo, NiMoW, CoMoW, oxides or sulphides as catalytic phase, supported on high surface area carbon, alumina, silica, titania or zirconia.

12. The process of claim 11, wherein the hydrodeoxygenation is carried out at a temperature from 200 to 500° C., under a pressure from 1 MPa to 10 MPa (10 to 100 bars) and with a hydrogen to feed ratio from 100 to 2000 Nl/l.

13. The process of claim 6, wherein said phase S is transformed into linear or substantially linear paraffins as bio-naphtha by hydrolysis into glycerol and fatty acids, removal of the glycerol or by physical refining, including a steam distillation or vacuum distillation of fats & oils or obtained by acidulation of soaps and hydrodeoxygenation or decarboxylation of the fatty acids;

said hydrodeoxygenation or decarboxylation being conducted in the presence of hydrogen and of at least one catalyst selected among Ni, Mo, Co, NiW, NiMo, CoMo, NiCoW, NiCoMo, NiMoW, CoMoW, oxides or sulphides as catalytic phase, supported on high surface area carbon, alumina, silica, titania or zirconia; or group 10 and group 11 metals or alloy mixtures supported on high surface area carbon, magnesia, zinc-oxide, spinels, perovskites, calciumsilicates, alumina, silica or silica-alumina's or mixtures of the latter.

14. The process of claim 6, wherein said phase S is transformed into linear or substantially linear paraffins as the bio-naphtha by hydrolysis into glycerol and fatty acids, removal of the glycerol or by physical refining, including a steam distillation or vacuum distillation of fats & oils or obtained by acidulation of soaps and decarboxylation of the fatty acids is carried out on basic oxides, alkaline earth oxides, lanthanide oxides, zinc-oxide, spinels, perovskites, calciumsilicates, either as bulk material or dispersed on neutral or basic carriers, on basic zeolites.

15. The process of claim 6, wherein the hydrodeoxygenation is carried out at a temperature from 200 to 500° C., under a pressure from 1 MPa to 10 MPa (10 to 100 bars) and with a hydrogen to feedstock ratio from 100 to 2000 Nl/l, or wherein the decarboxylation is carried out at a temperature from 100 to 550° C., under a pressure from 0.1 MPa to 10 MPa (1 to 100 bars) and with a hydrogen to feedstock ratio from 0 to 2000 Nl/l.

16. The process of claim 6, wherein the decarboxylation of the soaps is carried out at from 100 to 550° C. under pressure from 0.1 Mpa to 10 Mpa and in presence of water.

17. The process of claim 6, wherein the decarboxylation of the soaps is carried out with a water to feedstock ratio of at least 1 mole water per mole of soap.

18. The process of claim 1, wherein the complex mixture of natural occurring fats & oils is selected among vegetable oils and animal fats, inedible oils, highly saturated oils, waste food oils, by-products of the refining of vegetable oils, and mixtures thereof.

19. The process of claim 1, wherein the non-triglyceride and non-fatty acid components comprise free fatty acids.

20. A process comprising:
steamcracking a feedstock comprising a bio-naphtha, wherein the bio-naptha is produced from a complex mixture of natural occurring fats & oils that has been subjected to a refining treatment for removing a major part of non-triglyceride and non-fatty acid components, wherein the non-triglyceride and non-fatty acid components comprise free fatty acids.

* * * * *